(12) United States Patent
Schwartz et al.

(10) Patent No.: US 10,670,512 B1
(45) Date of Patent: Jun. 2, 2020

(54) APPARATUS TO PERFORM INTRINSIC HYPER-SPECTRAL FLOW CYTOMETRY

(71) Applicant: Center for Quantitative Cytometry, San Juan, PR (US)

(72) Inventors: Abraham Schwartz, San Juan, PR (US); Frank Mandy, Ontario (CA)

(73) Assignee: Center for Quantitative Cytometry, San Juan, PR (US)

( * ) Notice: Subject to any disclaimer, the term of this patent is extended or adjusted under 35 U.S.C. 154(b) by 0 days.

(21) Appl. No.: 16/657,956

(22) Filed: Oct. 18, 2019

(51) Int. Cl.
| | |
|---|---|
| *G01N 15/14* | (2006.01) |
| *G01J 3/18* | (2006.01) |
| *G01N 21/64* | (2006.01) |
| *G01J 3/12* | (2006.01) |
| *G01J 3/44* | (2006.01) |
| *G01J 3/36* | (2006.01) |

(52) U.S. Cl.
CPC ............ *G01N 15/1434* (2013.01); *G01J 3/18* (2013.01); *G01J 3/36* (2013.01); *G01J 3/4406* (2013.01); *G01N 15/147* (2013.01); *G01N 15/1475* (2013.01); *G01N 21/6428* (2013.01); *G01J 2003/1208* (2013.01); *G01N 2015/144* (2013.01); *G01N 2015/1472* (2013.01); *G01N 2015/1493* (2013.01); *G01N 2021/6463* (2013.01)

(58) Field of Classification Search
CPC ............ G01N 15/1434; G01N 15/147; G01N 15/1475; G01N 2015/144; G01N 2015/1472; G01N 2015/1493
See application file for complete search history.

(56) References Cited

U.S. PATENT DOCUMENTS

| | | | |
|---|---|---|---|
| 5,867,264 A * | 2/1999 | Hinnrichs | G01J 3/04 356/310 |
| 6,433,325 B1 | 8/2002 | Trigg | |
| 8,185,320 B2 | 5/2012 | Rimm et al. | |
| 2011/0090500 A1* | 4/2011 | Hu | G01N 15/147 356/337 |
| 2018/0020129 A1* | 1/2018 | Schwartz | G06T 5/50 |
| 2018/0031480 A1* | 2/2018 | Sinclair | G01N 15/1427 |

FOREIGN PATENT DOCUMENTS

CN 109916804 A * 6/2019 ............. G01N 15/14

OTHER PUBLICATIONS

Yang—CN 109916804 A—Google Patents English Translation obtained Dec. 15, 2019. (Year: 2019).*

* cited by examiner

*Primary Examiner* — David P Porta
*Assistant Examiner* — Jeremy S Valentiner
(74) *Attorney, Agent, or Firm* — Hoglund & Pamias, PSC; Roberto J. Rios

(57) ABSTRACT

The Intrinsic Hyper-Spectral Flow Cytometer (IHSFC) and its associated methodology, improves current flow cytometry by eliminating the need of associated hardware-based elements currently used for spectral data detection. The (IHSFC), rather than using narrow band lasers to excite or interrogate the analytes, the flow stream is excited by a wide wavelength range beam. The raw data generated by the (IHSFC) are as follows; forward light scatter, right angle light scatter, coherent spectral data and non-coherent spectral data. The intrinsic fluorescent spectral components are extracted from the coherent and non-coherent spectral data.

15 Claims, 5 Drawing Sheets

* Numbers represent individual fluorescent gates

APPARATUS TO PERFORM INTRINSIC HYPER-SPECTRAL FLOW CYTOMETRY

TECHNICAL FIELD

This invention relates to a novel flow cytometry platform that is based on collection and analysis of intrinsic hyper-spectral data.

BACKGROUND

During the late 20$^{th}$ century a new biomedical platform, flow cytometry, appeared that revolutionized the field of hematopathology. It dramatically increased the speed of leukocyte subset analysis. The new platform was able to analyze cells or particles while they are in motion. The technology replaced visual counting with a microscope using epifluorescent illumination. Traditional data collection required about five minutes to identify 300 cells. Flow cytometers collects multi-parameter data at a rate of 5,000 cells per second. Sample data files contain at least 100,000 cell/particle events.

A flow cytometer as shown in FIG. 5, operates with an aqueous laminar focused flow column. The interrogation of particles occurs through a window perpendicular to the flow stream. Light scattered by cells/particles is captured as they flow in single file. While in flight, two kinds of optical signals are processed, 1) scattered light as it is related to morphology (i.e., size, volume, granularity) and 2) fluorescent signals that are specific to leukocyte subsets of interest. Normally, narrow wavelength lasers are used as illumination sources. To capture signals, sets of optical detectors with barrier filters and dichroic mirrors are arranged around the column. This permits digital fluorescence data collection over a specific narrow emission wavelength range. Flow cytometry data is managed by a dedicated software system that correlates the light scatter data with the various spectral channels that serve as leukocyte subset identifiers.

The current generation of clinical flow cytometers can correlate and display data from fifteen or more different light scatter and spectral channels. Having this many fixed channels requires a complex optical path of filters, mirrors and a PMT (photomultiplying tube) for each fluorescent channel. Moreover, separating this many spectral channels presents a significant challenge since the spectral properties of fluorescent dyes used to label cells tend to spill over into more than one channel, complicating subset separation.

SUMMARY OF THE INVENTION

The present invention presents a flow cytometry apparatus that provides a unique strategy for collection and analysis of intrinsic hyper-spectral data. This novel invention eliminates the need for lasers, barrier filters, dichroic mirrors and PMTs for spectral data detection. The invention captures and reveals not only the fluorescence emission of the labeled cells/particles, but it is also able to reveal additional intrinsic spectral components such as absorption, Raman scatter and partial reflection.

This present invention has the advantage of providing great flexibility in setting spectral software channels (gates) that can avoid the spectral cross over that occurs in fixed hardware spectral channels. This in turn may simplify quality control management and assay standardization for multicolor clinical assays across instruments, software and fluorescent probes.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Intrinsic Hyper-Spectral Flow Cytometry is a novel methodology based on the concept of intrinsic spectroscopy where intrinsic spectral components are revealed when a material absorbs electromagnetic illumination energy and the unabsorbed illumination energy is eliminated by intrinsic processing as described in U.S. Pat. Nos. 9,435,687, 9,998,636, 10,337,91, and co-pending U.S. application Ser. No. 16/657,937, incorporated herein on their entirety by reference.

To simplify the description of the invention, terms that are more familiar to the flow cytometry field will be used. For the purpose of the description, the cells or particles being analyzed will be referred to as analytes. The illumination energy of the flow stream will be referred to as the excitation energy. In addition, for the purpose of explaining the invention, the intrinsic spectral components of the analytes will be referred to as fluorescence, even though it should be apparent that includes all intrinsic spectral components generated by absorption of electromagnetic energy.

Figure 1A:
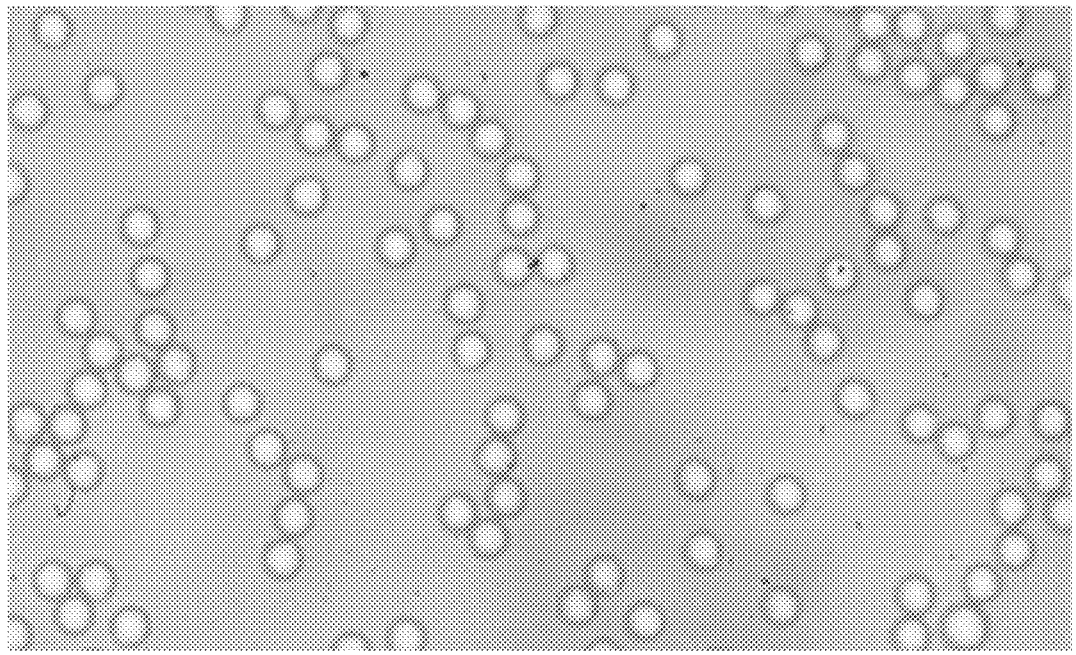
FIG. 1a shows a bright field image of fluorescein labeled 7.4 micron microbeads taken with a standard light microscope using unfiltered halogen illumination.
Figure 1B:
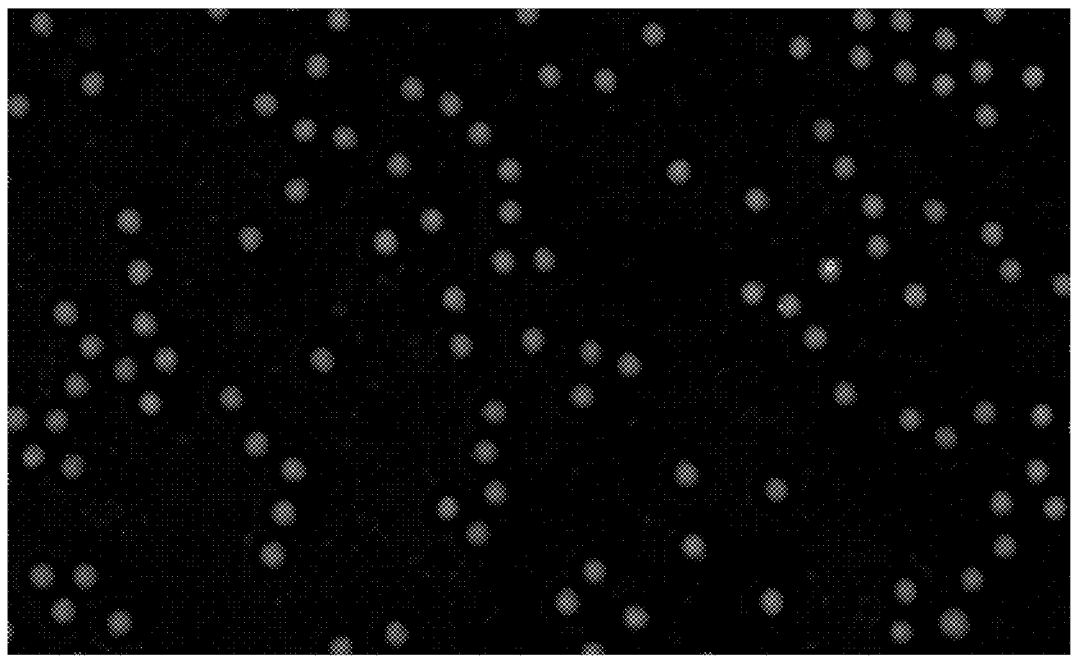
FIG. 1b shows a fluorescence image of the 7.4 micron fluorescein labeled microbeads obtained from the standard light microscope using unfiltered halogen illumination after intrinsic processing, according to the present invention.

Preliminary, a bright field image was obtained from a light microscope using unfiltered halogen illumination of fluorescein labeled microbeads, as shown in FIG. 1a. Coherent (focused) and non-coherent (defocused) images of the microbeads were acquired and intrinsically processed as described in co-pending U.S. application Ser. No. 16/657,937. This resulted in an image of the microbeads expressing green fluorescence emission, as shown in FIG. 1b. This demonstrated that the spectral properties of labeled analytes necessary to perform flow cytometry can be obtained using intrinsic processing described herein.

Basically, an Intrinsic Hyper-Spectral Flow Cytometer (IHSFC) produces four correlated data streams. As in current flow cytometers, analytes pass through a focusing laminar flow steam. However, according to the present invention, rather than using narrow band lasers to excite or interrogate the analytes, the flow stream is excited by a wide wavelength range beam. The raw data generated by the (IHSFC) are as follows; forward light scatter, right angle light scatter, coherent spectral data and non-coherent spectral data. The intrinsic fluorescent spectral components are extracted from the coherent and non-coherent spectral data by the method described in the above-mentioned patents and co-pending application.

As it is related to light scatter parameter collection, the (IHSFC) flow system functions similar to conventional flow cytometers where the sample stream is focused and maintained in a laminar flow condition. However, the excitation and spectral detection system in the (IHSFC) platform is novel to flow cytometry. First, rather than having separate multiple narrow band lasers associated with specific spectral channels, the (IHSFC) excitation system combines multiple wide wavelength range energy sources into a single excitation beam whose wavelength range covers the combined wavelength range of the sources. In addition, the spectral data from an (IHSFC) are obtained using diffraction elements and sensitive pixel arrays, instead of the barrier filters, dichroic mirrors and photomultiplier tubes. In a preferred embodiment, the diffraction components can be optical prisms or diffraction gratings that are responsive to the wavelength range of the excitation wavelength range and the intrinsic fluorescence of the natural and labeled analytes. According to an embodiment of the invention, the (IHSFC) captures the diffraction spectra with cooled CCD pixel arrays or C-MOS pixel arrays.

Figure 3:
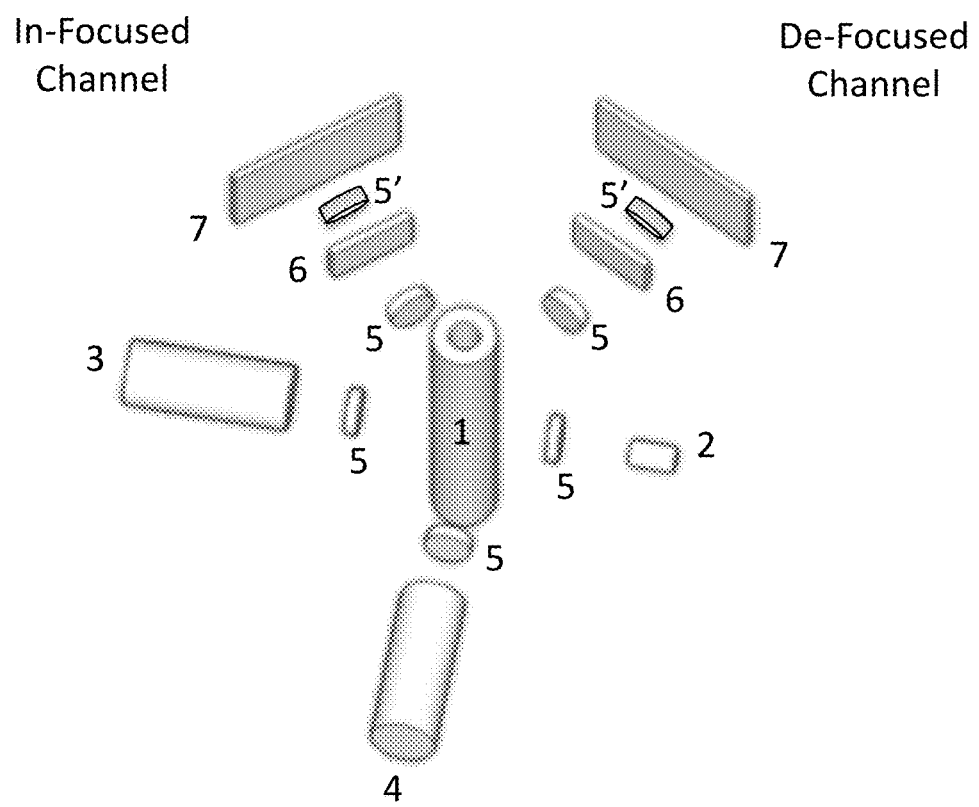
FIG. 3 illustrates the Intrinsic Hyper-Spectral Flow Cytometer, according to an embodiment of the present invention.
Figure 4:
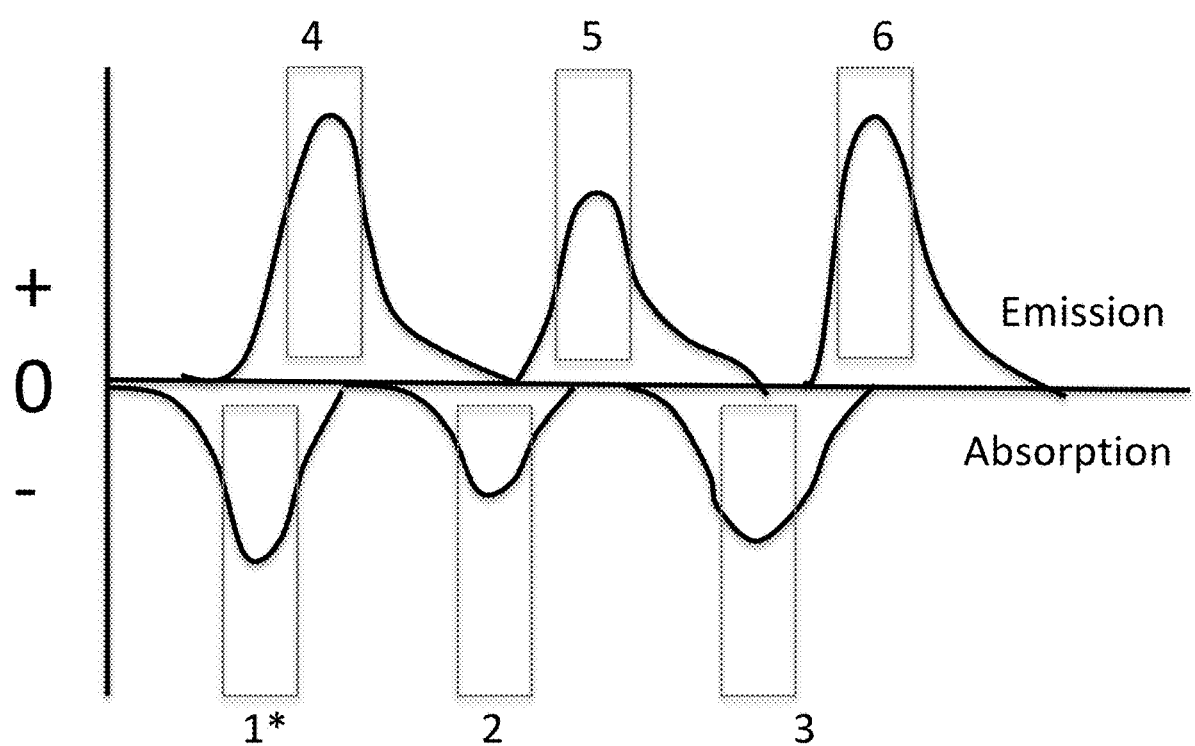
FIG. 4 shows a simulation of an intrinsic hyper-spectrum where it can be gated either on emission peaks or on absorption envelops separately or on both.
Figure 5:
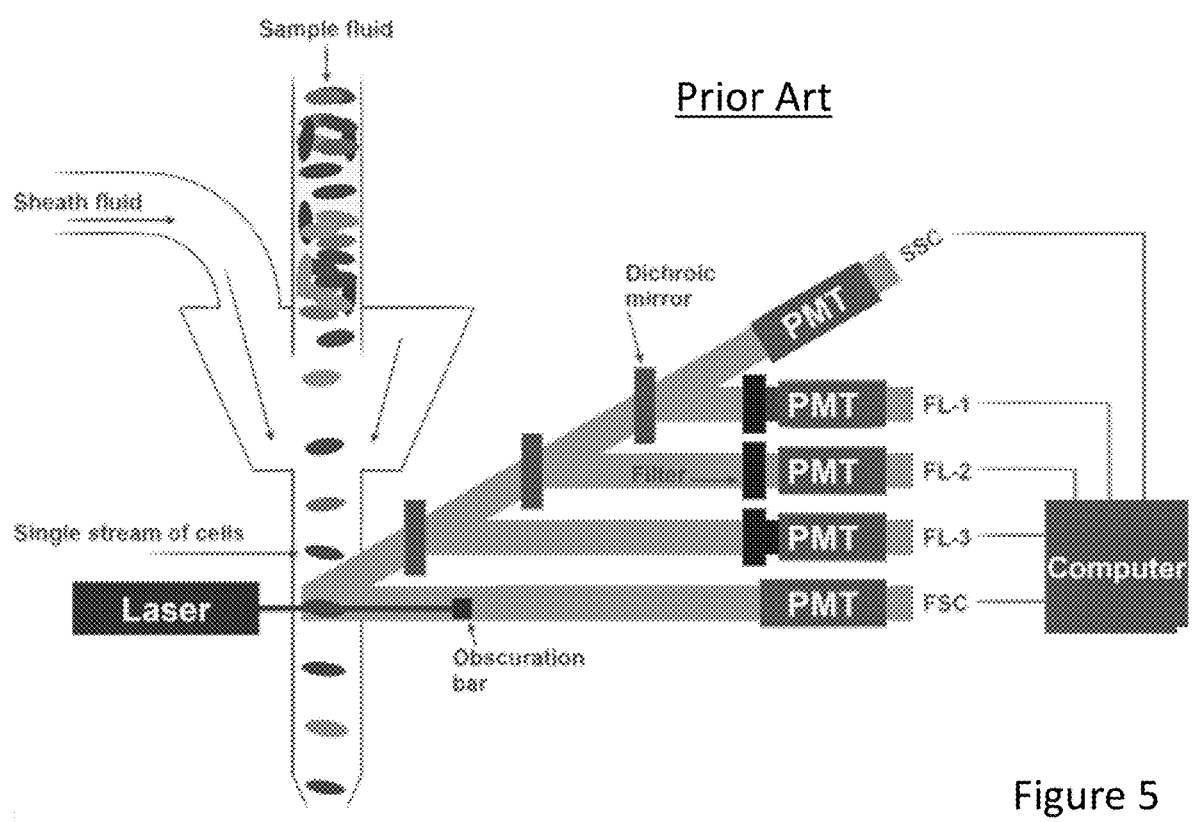
FIG. 5 illustrates a traditional flow cytometer, according to the prior art.

An important aspect in the (IHSFC) platform is the use of two correlated spectral data streams. The coherent spectral data stream is obtained by focusing an image of the analytes in the flow stream onto the pixel array (In-Focused Channel), whereas the non-coherent spectral data stream is obtained by defocusing the image of the analytes in the flow stream onto either a second equivalent pixel array or a different position of the first pixel array (De-Focused Channel). The focusing and defocusing processes are accomplished using optical lenses. According to an embodiment of the invention, as illustrated in FIG. 3, the image of the analytes in the flow stream can be focused and/or defocused by the lens (5) provided between the fluidic system with the sample flow (1) and the diffraction element (6) and/or by the lens (5') provided between the diffraction element (6) and the high sensitive pixel array (7) in the respective In-focused and De-focused channels.

This novel instrument design and data processing offers a method to generate flexible multiple color channels (gates) that are required to separate the analytes into unique sub-populations. Intrinsic spectra reveal not only fluorescence peaks but also absorption envelopes in the same spectrum. This new approach eliminates the need for filter sets of fixed color bandwidth and spectral wavelength. Spectral channels can readily be defined via software to accommodate for fluorescent probes used to label analytes, as well as, intrinsic spectral components of the analytes themselves. Compensation adjustments are fundamentally eliminated with (IHSFC). Flexible multi-parameter gates can isolate particular fluorescent probes with considerable efficiency and clarity.

Methodology
Instrument Calibration

The instrument of the present invention is calibrated with non-fluorescent particles such as unlabeled polymeric microbeads. The light scatter data are gated on the singlet population to provide simplified spectral data analysis of the analytes. Each analyte passing through the excitation beam is correlated with its focused and defocused spectral data and processed by subtracting the defocused spectrum from the focused spectrum. The resulting spectra are averaged pixel by pixel across the wavelength range of the excitation energy to yield the Average Residual Spectrum (ARS) at the specific instrument settings. The ARS is then added back into each of the defocused spectra and the adjusted defocused set of spectra are subtracted from the focused spectra of each analyte, respectively. This process produces a Zero Order Spectrum (ZOS) for the analyte that has a zero value across its entire excitation wavelength range. This validates that the instrument is calibrated and ready to collect intrinsic spectral data.

Extraction of Hyper-Spectral Intrinsic Spectra

Without changing flow cytometer settings, the analyte of interest is run and the ARS from the calibration step is added to the spectra of each analyte of the defocused data stream. These adjusted defocused spectra are then subtracted from the corresponding focused spectra of each analyte. This procedure generates the intrinsic spectra of the analytes that contains both the absorption and fluorescence spectral components across the excitation wavelength range.

IHSFC Correlation of Specific Spectral Components

The initial gating process can be set to determine populations via their forward and side scatter plots. Gating on selected scatter populations isolates the combination of all intrinsic spectral components of the gated analyte scatter population. The average intrinsic spectrum of the scatter population can then be gated into as many color channels as necessary directly on the intrinsic spectrum to isolate the analyte sub-populations.

With the (IHSFC) of the present invention, it is possible to increase the specificity and reliability of flow cytometry data. Correlated light scatter and intrinsic fluorescence spectra of analytes may revealed populations that may have been hidden due to limitations of traditional fixed bandwidth color channels.

Simulation of a Wide Wavelength Range Illumination System

Figure 2:
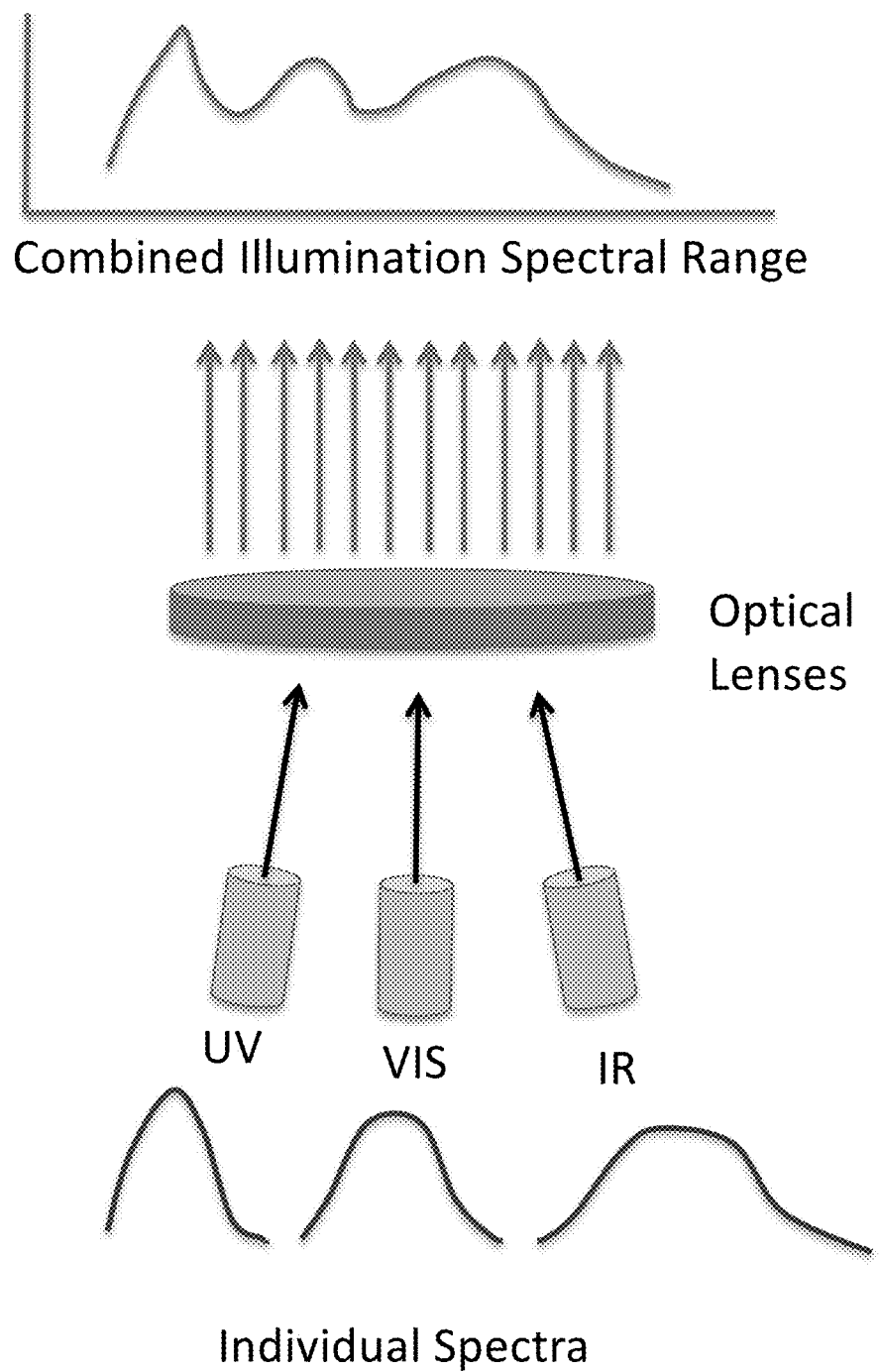
FIG. 2 illustrates how multiple illumination sources of different wavelength ranges can be combined to provide a single wide wavelength range illumination source.

Currently in flow cytometry, multiple narrow wavelength lasers are used simultaneously as multiple excitation sources. They excite analytes with a number of separated narrow wavelength range excitation lines as they move through the flow stream. However, the (IHSFC) according to the present invention, uses a single wide wavelength range excitation source. The concept of extending the illumination source for intrinsic spectroscopy is explained in U.S. Pat. No. 10,337,916, incorporated herein by reference in its entirety. Such an extended excitation source can be constructed by combining excitation sources that cover the excitation wavelength range of the fluorescent probes used to label analytes, for example, the wavelength range from Ultraviolet (UV) to the Infrared (IR). This can be accomplished with light emitting diodes (LED) of different wavelength ranges that cover such a wavelength range (i.e., 365-980 nm). Optical lenses would combine the different excitation ranges of the LEDs into a singlewide range excitation beam as illustrated in FIG. 2.

Hyper-Spectral Flow Cytometer
Hardware Components

FIG. 3 illustrates the general configuration of an Intrinsic Hyper-Spectral Flow Cytometer (IHSFC) according to an embodiment of the present invention. Most of the hydrodynamic and electronic components of current or traditional flow cytometers are used in the (IHSFC) platform. For example, the fluidic system is the same where the sample stream (1) is contained inside a sheath fluid stream that hydro dynamically focuses samples into a laminar flow. The forward light scatter channel and side light scatter channel are also consistent with the current flow cytometer design where PMTs (3, 4) serve as detectors for analyte size and granularity. Focus lenses (5) are used to focus the illumination source as well as to focus scattered light onto respective PMTs.

However, the present invention provides a unique and different spectral acquisition system and methodology. Traditionally, flow cytometers use narrow band lasers, barrier filters, dichroic mirrors and PMT's. The (IHSFC) system of the invention employs multiple wide wavelength range excitation sources that are combined into an extended wide wavelength range excitation source (2) directed towards the sample stream (1). Diffraction elements such as gratings (6) and highly sensitive pixel arrays (7) are used for spectral detection. The response of the diffraction gratings and pixel arrays are matched to the extended wide wavelength range of the combined excitation sources so that the entire radiation from the analytes is efficiently diffracted. The most sensitive pixel arrays are complementary metal oxide semiconductor (CMOS) detectors. Currently, (CMOS) are used to create fast high-resolution images. In a preferred embodiment of the invention, (CMOS) pixel arrays serve as spectral detectors when combined with diffraction gratings. Focus lenses (5) are used to focus analyte images onto the spectral detection system of the present invention.

Analysis Software

To synchronize data acquisition, intrinsic processing and channel gating, new software is used for (IHSFC) operation. As an example, FIG. 3 illustrates how gates may be assigned to an average intrinsic spectrum. Intrinsic spectral channels can be defined by gating on absorption envelops, as well as, emission peaks, or on a combination of both. To analyze sample sub-populations, standard 2-dimensional dot plots, as well as 3-dimensional dot clouds may be constructed using light scatter and intrinsic spectral gates. As can be appreciated, with the proposed (IHSFC) and associated methodology, multiple software-based gates or channels can be defined and assigned instead of using the traditional fixed channels that require a complex optical path of filters, mirrors and PMTs. Data processing means including but not limited to a computer are provided to receive and process all the data generated from the light scatter arrays and the spectral detection system of the present invention.

Accordingly, the Intrinsic Hyper-Spectral Flow Cytometer (IHSFC) and its associated methodology, improves current flow cytometry by eliminating the need of associated hardware-based elements currently used for spectral data detection. Moreover, the present invention provides a solution that solves the technological problem of having spectral properties spilling over into more than one gate or channel. This is achieved by defining software-based gates/channels that are tailored or designed in accordance with the hyper-spectral intrinsic spectrum obtained with the novel Intrinsic Hyper-Spectral Flow Cytometer (IHSFC).

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. An apparatus to perform Intrinsic Hyper-Spectral Flow Cytometry comprising:
    a fluidic system;
    a wide wavelength range illumination source provided to excite analytes of interest on said fluidic system; and
    a spectral detection system having an in-focused channel configured to generate a focused spectral data of said analytes of interest and a de-focused channel configured to generate a defocused spectra data of said analytes of interest.

2. The apparatus of claim 1, further comprising a light scatter array configured to receive forward and side scattered light from said analytes of interest when excited by said wide wavelength range illumination source.

3. The apparatus of claim 1, wherein said wide wavelength range illumination source comprises a combination of a plurality of wide wavelength range illumination sources.

4. The apparatus of claim 3, wherein said plurality of wide wavelength range illumination sources are combined with optical lenses.

5. The apparatus of claim 1, wherein the wide wavelength range is selected from Ultraviolet (UV) to Infrared (IR).

6. The apparatus of claim 1, wherein said in-focused channel comprises a diffraction element and a sensitive pixel array receiving said focused spectral data and said defocused channel comprises another diffraction element and another sensitive pixel array receiving said defocused spectral data.

7. The apparatus of claim 6, wherein said diffraction element and said sensitive pixel array are responsive to the wavelength range of the single wide wavelength range illumination source and to intrinsic fluorescence of natural and labeled analytes.

8. The apparatus of claim 6, wherein said diffraction element comprises at least one of: an optical element or a diffraction grating.

9. The apparatus of claim 6, wherein said sensitive pixel array comprises at least one of: a cooled CCD pixel array or a C-MOS pixel array.

10. The apparatus of claim 6, wherein the in-focused channel comprises a diffraction element, the de-focused channel comprises another diffraction element and a single sensitive pixel array is provided so that said focused spectral data is received at a first portion of said single sensitive pixel array and said defocused spectral data is received at a second portion of the same single sensitive pixel array.

11. The apparatus of claim 1, further comprising data processing means that provides at least one color gate directly on intrinsic spectrum generated from data received from said spectral detection system.

12. The apparatus of claim 1, wherein said in-focused channel comprises a diffraction element provided between said sensitive pixel array and a fluidic system having said analytes of interest, said focused spectral data being focused prior to reaching said diffraction element.

13. The apparatus of claim 1, wherein said in-focused channel comprises a diffraction element provided between said sensitive pixel array and a fluidic system having said analytes of interest, said focused spectral data being focused after leaving said diffraction element.

14. The apparatus of claim 1, wherein said de-focused channel comprises a diffraction element provided between said sensitive pixel array and a fluidic system having said analytes of interest, said defocused spectral data being defocused prior to reaching said diffraction element.

15. The apparatus of claim 1, wherein said de-focused channel comprises a diffraction element provided between said sensitive pixel array and a fluidic system having said analytes of interest, said defocused spectral data being defocused after leaving said diffraction element.

\* \* \* \* \*

UNITED STATES PATENT AND TRADEMARK OFFICE
CERTIFICATE OF CORRECTION

| | | |
|---|---|---|
| PATENT NO. | : 10,670,512 B1 | Page 1 of 1 |
| APPLICATION NO. | : 16/657956 | |
| DATED | : June 2, 2020 | |
| INVENTOR(S) | : Abraham Schwartz and Frank Mandy | |

It is certified that error appears in the above-identified patent and that said Letters Patent is hereby corrected as shown below:

In the Specification

On Column 2, Line 37 replace the first paragraph after the DETAILED DESCRIPTION OF THE INVENTION section with the following:
"Intrinsic Hyper-Spectral Flow Cytometry is a novel methodology based on the concept of intrinsic spectroscopy where intrinsic spectral components are revealed when a material absorbs electromagnetic illumination energy and the unabsorbed illumination energy is eliminated by intrinsic processing as described in U.S. Pat. Nos. 9,435,687, US 9,998,636, US 10,337,916, and US 10,652,484, incorporated herein on their entirety by reference."

On Column 2, Line 57 replace the last paragraph with the following:
"Preliminary, a bright field image was obtained from a light microscope using unfiltered halogen illumination of fluorescein labeled microbeads, as shown in FIG. 1a. Coherent (focused) and non-coherent (defocused) images of the microbeads were acquired and intrinsically processed as described in US Patent 10,652,484. This resulted in an image of the microbeads expressing green fluorescence emission, as shown in FIG. 1b. This demonstrated that the spectral properties of labeled analytes necessary to perform flow cytometry can be obtained using intrinsic processing described herein."

Signed and Sealed this
Fifteenth Day of September, 2020

Andrei Iancu
*Director of the United States Patent and Trademark Office*